United States Patent
Celik et al.

(10) Patent No.: US 11,491,819 B2
(45) Date of Patent: Nov. 8, 2022

(54) NON-PNEUMATIC SUPPORT STRUCTURE

(71) Applicant: The Goodyear Tire & Rubber Company, Akron, OH (US)

(72) Inventors: Ceyhan Celik, Stow, OH (US); Steven Amos Edwards, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 802 days.

(21) Appl. No.: 15/801,366

(22) Filed: Nov. 2, 2017

(65) Prior Publication Data

US 2019/0126685 A1    May 2, 2019

(51) Int. Cl.
*B60C 7/12*    (2006.01)
*B60B 9/26*    (2006.01)
*B60C 7/14*    (2006.01)

(52) U.S. Cl.
CPC ............... *B60C 7/12* (2013.01); *B60B 9/26* (2013.01); *B60C 7/14* (2013.01)

(58) Field of Classification Search
CPC .... B60B 9/18; B60B 9/26; B60B 9/10; B60B 9/02; B60C 7/12; B60C 7/125; B60C 7/16; B60C 2007/146; B60C 7/14
See application file for complete search history.

(56) References Cited

U.S. PATENT DOCUMENTS

| | | |
|---|---|---|
| 479,255 A | 7/1892 | Dunlop |
| 482,175 A | 9/1892 | Hollafolla |
| 1,002,003 A | 8/1911 | Simonson |
| 1,233,722 A | 7/1917 | Smith |
| 1,389,285 A | 8/1921 | Althoff |
| 1,402,190 A * | 1/1922 | Swinehart ................ B60C 7/10 152/326 |
| 1,451,517 A | 4/1923 | Smith |
| 1,930,764 A | 10/1933 | Mallory |
| 3,493,027 A | 2/1970 | Dewhirst |
| 4,093,299 A * | 6/1978 | Capps ...................... B60B 9/26 152/85 |
| 4,226,273 A | 10/1980 | Long |
| 4,235,270 A | 11/1980 | Kahaner |
| 4,602,823 A | 7/1986 | Berg |
| 5,343,916 A | 9/1994 | Duddey |
| 5,800,643 A | 9/1998 | Frankowski |
| 6,068,721 A | 5/2000 | Dyer |

(Continued)

FOREIGN PATENT DOCUMENTS

WO    WO-2017072562 A1 *    5/2017    ........... B60B 1/0261

OTHER PUBLICATIONS

U.S. Appl. No. 15/351,672, filed Nov. 15, 2016.

(Continued)

*Primary Examiner* — Scott A Browne
(74) *Attorney, Agent, or Firm* — Robert N. Lipcsik

(57) ABSTRACT

A tire assembly transfers rotation about an axis from an outer flexible ring to an inner central rim. The tire assembly includes a spoke structure extending radially between the inner central rim and the outer flexible ring. The spoke structure defines a plurality of radially extending closed cavities and an alternating plurality of radially extending inlet openings disposed concentrically about the axis and allowing the flexible ring to deflect under load. The closed cavities extend axially and circumferentially at a helical angle relative to the axis.

15 Claims, 6 Drawing Sheets

(56) References Cited

U.S. PATENT DOCUMENTS

| | | | |
|---|---|---|---|
| 6,244,669 B1* | 6/2001 | Braunschweiler | B60B 9/02 |
| | | | 301/79 |
| 6,260,598 B1 | 7/2001 | Tanaka | |
| 8,962,120 B2 | 2/2015 | Delfino | |
| 9,180,732 B2* | 11/2015 | Endicott | B60B 1/0223 |
| 9,248,697 B2* | 2/2016 | Iwamura | B60B 1/06 |
| 2004/0069385 A1* | 4/2004 | Timoney | B60B 9/26 |
| | | | 152/69 |
| 2010/0193097 A1 | 8/2010 | McNier | |
| 2012/0205017 A1* | 8/2012 | Endicott | B60B 1/042 |
| | | | 152/1 |
| 2016/0096400 A1* | 4/2016 | Nomura | B60B 9/04 |
| 2017/0113489 A1* | 4/2017 | Iwamura | B60C 7/102 |
| 2017/0113490 A1* | 4/2017 | Iwamura | B60C 7/18 |

OTHER PUBLICATIONS

U.S. Appl. No. 15/351,687, filed Nov. 15, 2016.
U.S. Appl. No. 15/351,706, filed Nov. 15, 2016.
U.S. Appl. No. 15/351,717, filed Nov. 15, 2016.
U.S. Appl. No. 15/351,727, filed Nov. 15, 2016.
U.S. Appl. No. 15/465,639, filed Mar. 22, 2017.

\* cited by examiner

NON-PNEUMATIC SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire.

SUMMARY OF THE INVENTION

A tire assembly in accordance with the present invention transfers rotation about an axis from an outer flexible ring to an inner central rim. The tire assembly includes a first spoke structure and a second spoke structure. The first spoke structure extends radially between the central rim and the flexible ring. The first spoke structure defines a plurality of radially extending closed cavities and an alternating plurality of radially extending inlet openings disposed concentrically about the axis and allowing the flexible ring to deflect under load. The closed cavities extend axially and circumferentially at a first helical angle relative to the axis. The second spoke structure extends radially between the central rim and the flexible ring. The second spoke structure defines a plurality of radially extending closed cavities and an alternating plurality of radially extending inlet openings disposed concentrically about the axis and allowing the flexible ring to deflect under load. The closed cavities extend axially and circumferentially at a second helical angle relative to the axis. The first helical angle is equal in magnitude to the second helical angle.

According to another aspect of the tire assembly, the first spoke structure is a mirrored opposite image of the second spoke structure.

According to still another aspect of the tire assembly, the first helical angle is in the range between 0° and 45°.

According to yet another aspect of the tire assembly, the second helical angle is in the range between 0° and −45°.

According to still another aspect of the tire assembly, each cavity of the plurality of closed cavities of the first spoke structure has a common radial dimension.

According to yet another aspect of the tire assembly, each cavity of the plurality of closed cavities of the second spoke structure has a common radial dimension.

According to still another aspect of the tire assembly, each cavity of the plurality of closed cavities of the first spoke structure has a common length equal to a uniform axial thickness of the first spoke structure divided by the cosine of the first helical angle.

According to yet another aspect of the tire assembly, each cavity of the plurality of closed cavities of the second spoke structure has a common length equal to a uniform axial thickness of the second spoke structure divided by the cosine of the second helical angle.

According to still another aspect of the tire assembly, the first spoke structure is a mirrored opposite image of the second spoke structure such that structures of the first spoke structure meet equivalent structures on the second spoke structure at a centerline of the tire assembly.

According to yet another aspect of the tire assembly, the first spoke structure is a mirrored opposite image of the second spoke structure such that structures of the first spoke structure are circumferentially offset from equivalent structures on the second spoke structure at a centerline of the tire assembly.

A method in accordance with the present invention non-pneumatically supports a mobile vehicle. The method includes the steps of: extending a first spoke structure axially and radially between an inner central rim and an outer flexible ring; rotating the first spoke structure about an axis; extending a second spoke structure axially and radially between an inner central rim and an outer flexible ring; rotating the second spoke structure about an axis; and vertically loading the flexible ring such that the flexible ring and a parts of the both the first and second spoke structures adjacent to the flexible ring all deflect vertically.

According to another aspect of the method, cavities and openings of the first spoke structure form a first helical angle relative to the axis.

According to still another aspect of the method, cavities and openings of the second spoke structure form a second helical angle relative to the axis.

According to yet another aspect of the method, the first helical angle is in the range between 0° and 45°.

According to still another aspect of the method, the second helical angle is in the range between 0° and −45°.

According to yet another aspect of the method, the first spoke structure is a mirrored opposite image of the second spoke structure such that structures of the first spoke structure meet equivalent structures on the second spoke structure at a centerline of the tire assembly.

According to still another aspect of the method, the first spoke structure is a mirrored opposite image of the second spoke structure such that structures of the first spoke structure are circumferentially offset from equivalent structures on the second spoke structure at a centerline of the tire assembly.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

Figure 1:
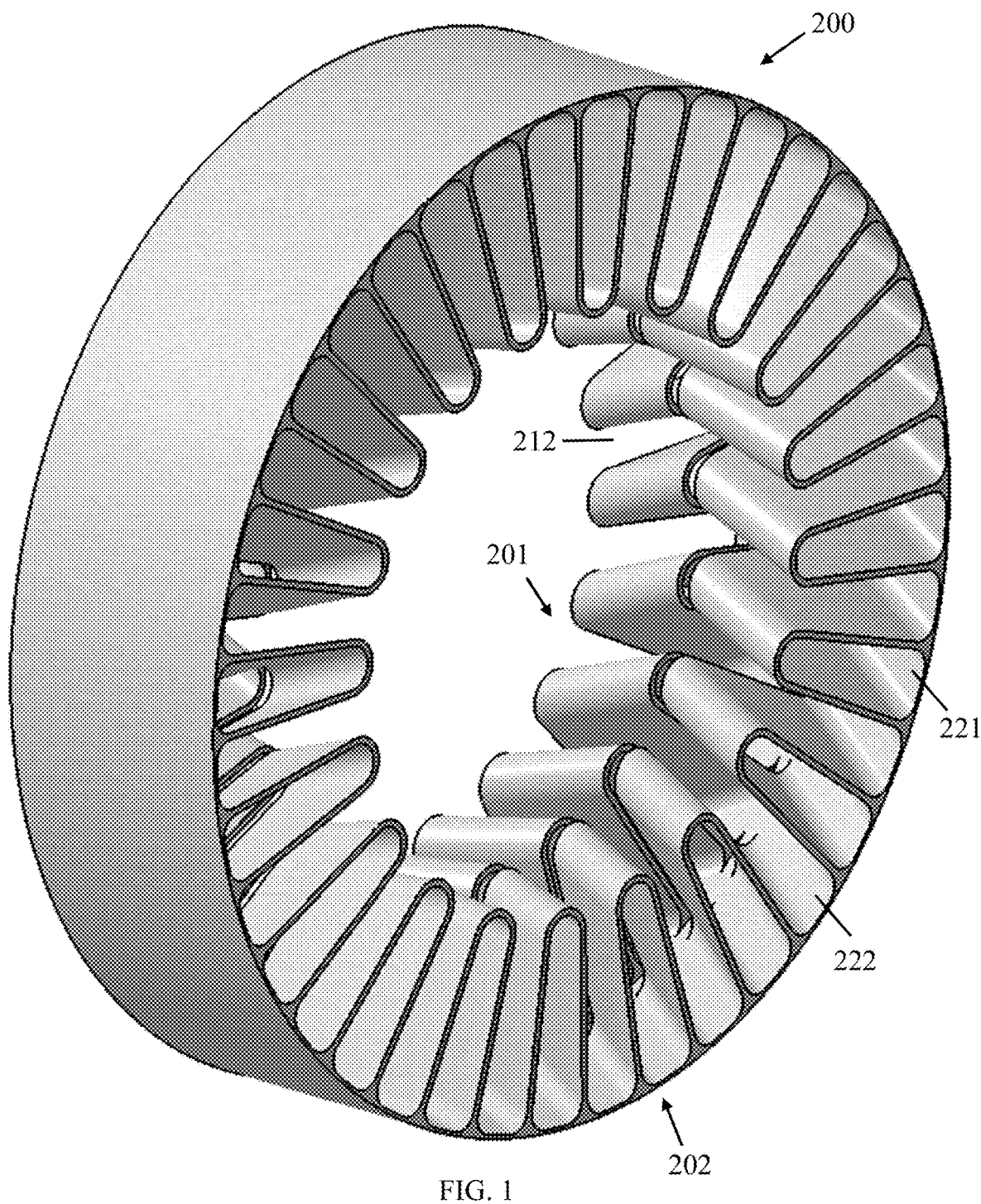
FIG. 1 is a schematic perspective view of an example assembly in accordance with the present invention.

A conventional wheel/tire assembly, such as that described in U.S. application Ser. No. 15/351,672 to applicant Goodyear and inventor C. Celik, incorporated herein by reference in its entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly may have an inner central rim, such as an automobile wheel, and a circular outer flexible ring, which may include a shear band and tread structure, mounted on the inner central rim by a continuous cord/fabric reinforced spoke structure extending between the inner central rim and the outer ring.

The spoke structure may define a plurality of cavities disposed concentrically about the inner central rim allowing the spoke structure to deflect under load thereby defining a suitable balance between flexibility for ride comfort and traction within a footprint of the assembly and stiffness for vehicle handling, low rolling resistance, and low heat build-up within the spoke structure. The cavities of the spoke structure may further define openings for arms of the inner central rim to extend therethrough and secure the spoke structure to the inner central rim. The arms may engage portions of the spoke structure in a mechanical interlocking arrangement. The inner central rim may further include plates that, along with the arms may sandwich the portions of the spoke structure and create a further frictional and/or adhesive securement between the inner central rim and the spoke structure. The spoke structure may comprise a homogenous or heterogeneous polymer and/or a filled polymer.

Spokes of the spoke structure may be curved inwardly or outwardly for mitigating or enhancing buckling of the spokes. The spokes may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The spokes may be oriented at angle between 0 degrees and 90 degrees. The spokes may be continuously reinforced across their entire axial length. Continuous reinforcement layer(s) may extend radially outward to multiple locations adjacent to a shear band at the outer flexible ring.

Each cavity may have a common cross sectional profile about the axis of rotation of the assembly. Further, each cavity may have a common axial length equal to a uniform axial thickness of the spoke structure. Each cavity may be curvedly shaped to prevent "pinch" points on the reinforcement layer(s) and mitigate compressive stress concentrations on the reinforcement layer(s). The number of cavities may be between 2 and 60 for large scale assemblies. The inner central rim may include steel, cast iron, aluminum, aluminum alloys, magnesium allows, and/or iron alloys.

Another conventional wheel/tire assembly, such as that described in U.S. application Ser. No. 15/465,639 to applicant Goodyear and inventor C. Celik, incorporated herein by reference in its entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly may have an inner central rim, such as an automobile wheel, and a circular outer flexible ring, which may include a shear band and tread structure, mounted on the inner central rim by a continuous cord/fabric reinforced spoke structure extending between the inner central rim and the outer ring.

The spoke structure may define a plurality of alternating cavities and inlet openings disposed concentrically about the inner central rim allowing the spoke structure to deflect under load thereby defining a suitable balance between flexibility for ride comfort and traction within a footprint of the assembly and stiffness for vehicle handling, low rolling resistance, and low heat build-up within the spoke structure. The cavities of the spoke structure may further define openings for arms of the inner central rim to extend therethrough and secure the spoke structure to the inner central rim. The arms may engage portions of the spoke structure in a mechanical interlocking arrangement. The inner central rim may further include plates that, along with the arms may sandwich the portions of the spoke structure and create a further frictional and/or adhesive securement between the inner central rim and the spoke structure. The spoke structure may comprise a homogenous or heterogeneous polymer and/or a filled polymer.

Spokes of the spoke structure may be curved inwardly or outwardly for mitigating or enhancing buckling of the spokes. The spokes may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The reinforcement in the spokes may be oriented at angle between 0 degrees and 90 degrees. The spokes may be continuously reinforced across their entire axial length. Continuous reinforcement layer(s) may extend radially outward to multiple locations adjacent to a shear band at the outer flexible ring.

Each cavity and inlet opening may have a common cross sectional profile about the axis of rotation of the assembly. Further, each cavity and inlet opening may have a common axial length equal to a uniform axial thickness of the spoke structure. Each cavity may be curvedly shaped to prevent "pinch" points on the reinforcement layer(s) and mitigate compressive stress concentrations on the reinforcement layer(s). The number of cavities may be between 2 and 60 for large scale assemblies. The inner central rim may include steel, cast iron, aluminum, aluminum alloys, magnesium allows, iron alloys, plastics, and/or composites. The spoke structure may further have additional cavities for further adjusting the flexibility of the spoke structure.

Figure 2:
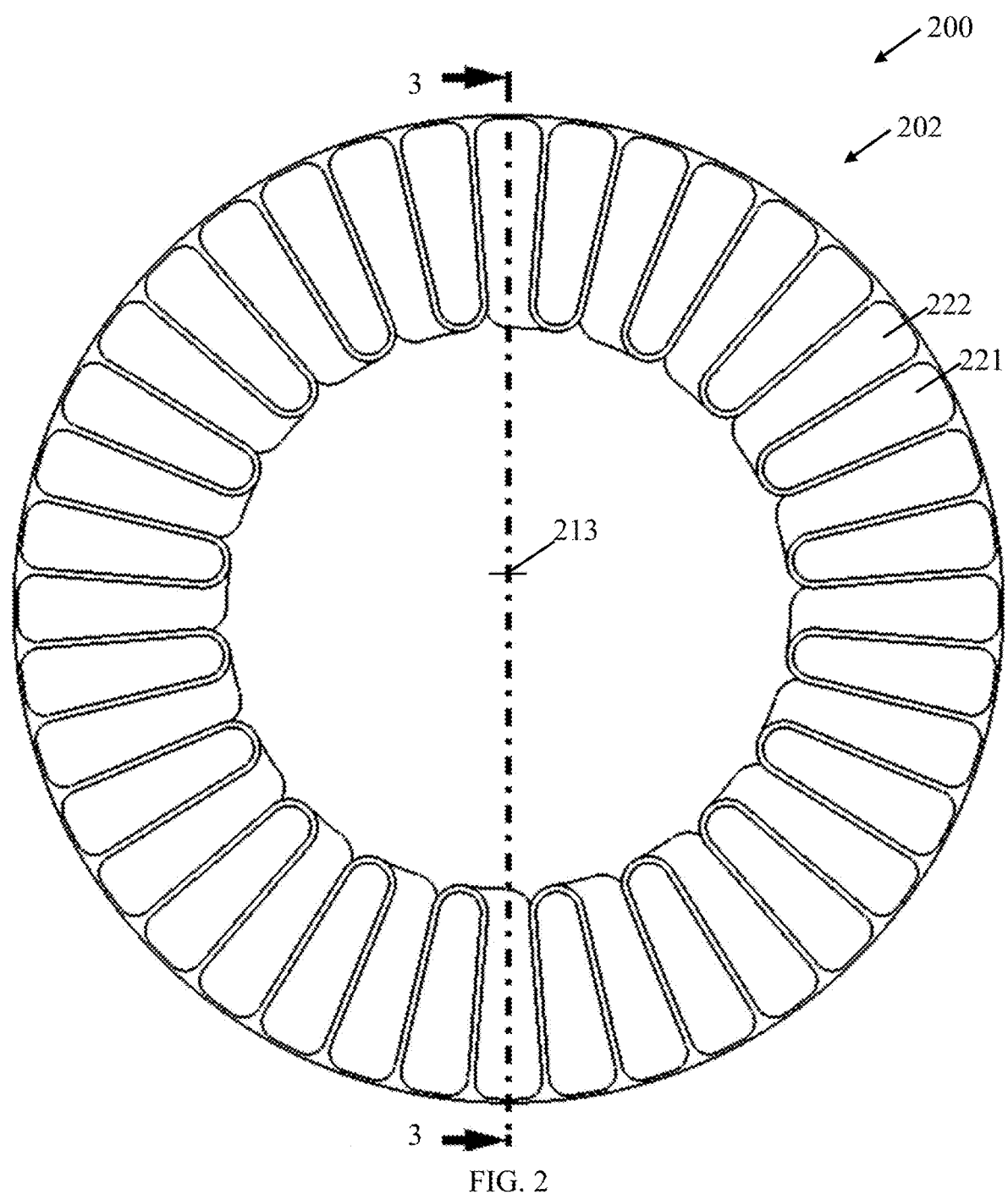
FIG. 2 is a schematic side view of the assembly of FIG. 1.
Figure 3:
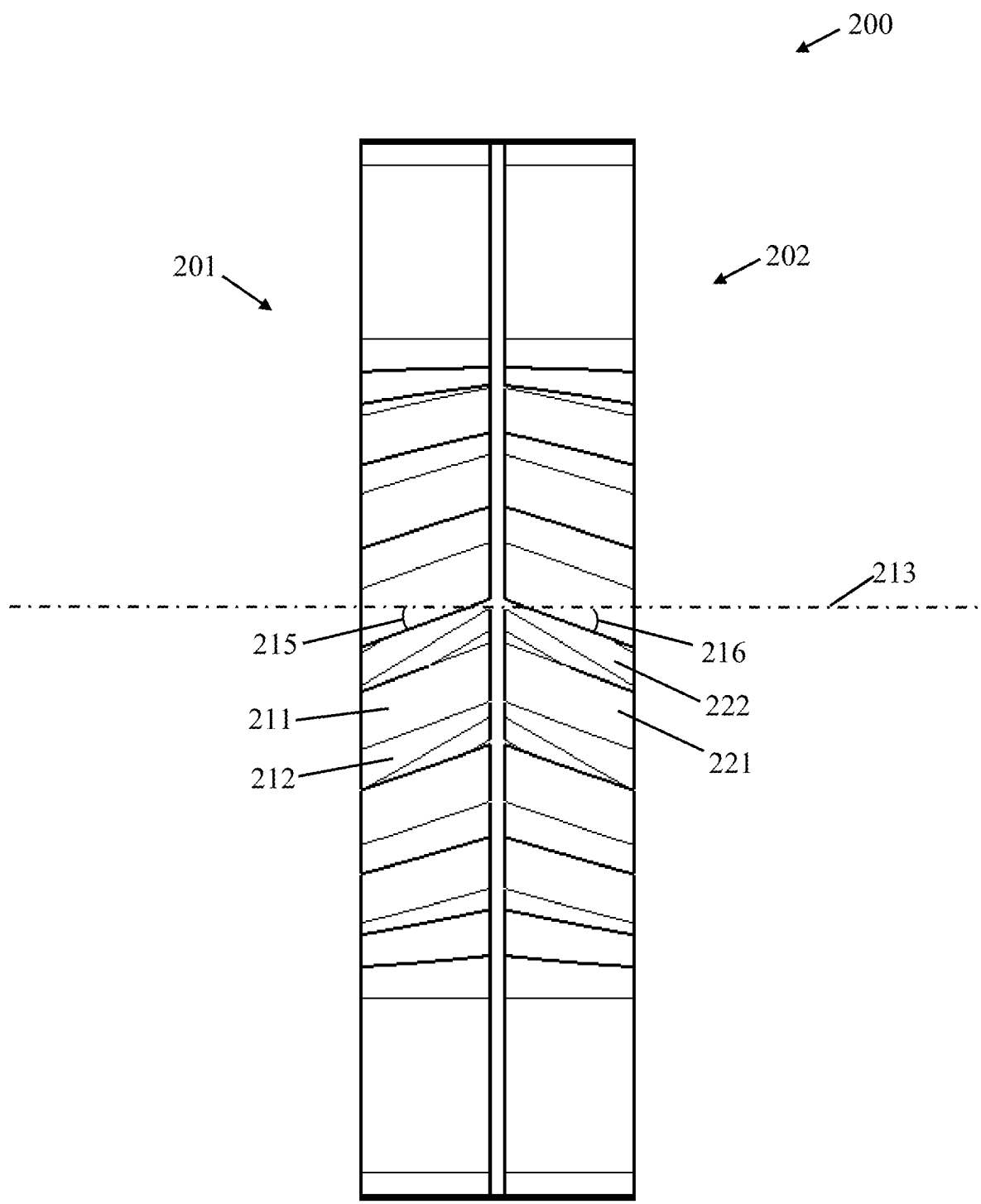
FIG. 3 is a schematic section view taken along line "3-3" in FIG. 2.

As shown in FIGS. 1-3, an example tire assembly 200 in accordance with the present invention may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly 200 may have an inner central rim (not shown), such as an automobile wheel as described above, and a circular outer flexible ring (not shown), which may include a shear band with a tread structure, mounted on the inner central rim by a continuous cord/fabric reinforced spoke structure 201 and/or 202 extending between the inner central rim and the outer flexible ring.

As shown in FIGS. 1-3, the tire assembly 200 in accordance with the present invention may include a first spoke structure 201 and a second spoke structure 202 each defining a plurality of alternating rectangular or trapezoidal closed cavities 211, 221 and rectangular or trapezoidal inlet openings 212, 222, respectively, rotating concentrically about a rotational axis 213 thereby allowing the spoke structures 201, 202 to deflect under load and define a suitable balance between flexibility for ride comfort and traction within a footprint of the assembly 200 and stiffness for vehicle handling, low rolling resistance, and low heat build-up within the spoke structures. The cavities 211 of the first spoke structure 201 and the cavities 221 of the second spoke structure 202 may further define openings for arms of the inner central rim to extend therethrough and secure the spoke structure to the inner central rim, as described above. The arms may engage portions of the spoke structures 201, 202 in a mechanical interlocking arrangement. The inner central rim may further include plates that, along with the arms, may sandwich portions of the spoke structures 201, 202 and create a further frictional and/or adhesive securement between the inner central rim and the spoke structure. The spoke structures 201, 202 may comprise homogenous or heterogeneous polymers and/or filled polymers.

The alternating cavities 211 and inlet openings 212 of the first spoke structure 201 may be formed such that each of the cavities and inlet openings of the first spoke structure form a first helical angle 215 relative to the rotational axis 213 of the assembly 200 (FIG. 3). The first helical angle 215 may be in the range from 0° to 45°. Thus, the cavities 211 and inlet openings 212 may extend axially, radially, and circumferentially relative to the rotational axis 213.

The alternating cavities 221 and inlet openings 222 of the second spoke structure 202 may be formed such that each of the cavities and inlet openings of the second spoke structure form a second helical angle 216 relative to the rotational axis 213 of the assembly 200 (FIG. 3). The second helical angle 216 may be in the range from 0° to −45°. Thus, the cavities 221 and inlet openings 222 may extend axially, radially, and circumferentially relative to the rotational axis 213. As shown in FIG. 3, the first helical angle 215 and the second helical angle 216 may be equal and opposite (e.g., 45° and −45°) and the spoke structures 201, 202 may be mirrored images of each other with common points meeting at a centerline of the assembly 200.

Such a construction of the assembly 200 may improve uniformity and reduce noise generation during use. The helical spoke structures 201, 202 may gradually buckle and then gradually stretch or tension while entering and leaving a footprint while the assembly rotates. This gradual buckling and tensioning may contribute to the reduction of noise generation. Since the spoke structures 201, 202 contact the shearband in both lateral and longitudinal directions, uniformity may be improved. Further, durability may be improved by a self cooling feature caused by the helical spoke structures 201, 202 moving, or pumping, air through the tire assembly 200 as the spoke structures buckle and tension during use.

The spoke structures 201, 202 may be curved inwardly or outwardly for mitigating or enhancing buckling of the spoke structures (not shown). The spoke structures 201, 202 may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be between 400 denier to 9000 denier. The polymeric film may be from 0.1 mm to 2.0 mm thick. The reinforcement in the spoke structures 201, 202 may be oriented at angle between 0 degrees and 90 degrees. The spoke structures 201, 202 may be continuously reinforced across their entire axial length. Continuous reinforcement layer(s) may extend radially outward to multiple locations adjacent to the shear band at the outer flexible ring. Other reinforcement layers may extend about the interior of the closed cavities 211, 221. The continuous reinforcement layer(s) may be integrated into the spoke structures 201, 202 and the outer flexible ring. Alternatively, the shear band may be attached to the spoke structures 201, 202 by between 10 and 40 connection points each (e.g., adhesive, fused, welded, etc.).

Each cavity 211 and inlet opening 212 of the first spoke structure 201 may have a common cross sectional profile, respectively, about the rotational axis 213 of the assembly 200. Further, each cavity 211 and inlet opening 212 may have a common axial length, respectively, equal to a first uniform axial thickness of the first spoke structure 201. Each cavity 211 may be curvedly shaped to prevent "pinch" points on the reinforcement layer(s) and mitigate compressive stress concentrations on the reinforcement layer(s). The number of cavities 211 may be between 2 and 60 for large scale assemblies 200.

Each cavity 221 and inlet opening 222 of the second spoke structure 202 may have a common cross sectional profile, respectively, about the rotational axis 213 of the assembly 200. Further, each cavity 221 and inlet opening 222 may have a common axial length, respectively, equal to a second uniform axial thickness of the second spoke structure 202. The second uniform axial thickness of the second spoke structure 202 may be equal to the first uniform axial thickness of the second spoke structure 202. Each cavity 221 may be curvedly shaped to prevent "pinch" points on the reinforcement layer(s) and mitigate compressive stress concentrations on the reinforcement layer(s). The number of cavities 221 may be between 2 and 60 for large scale assemblies 200.

Figure 4:
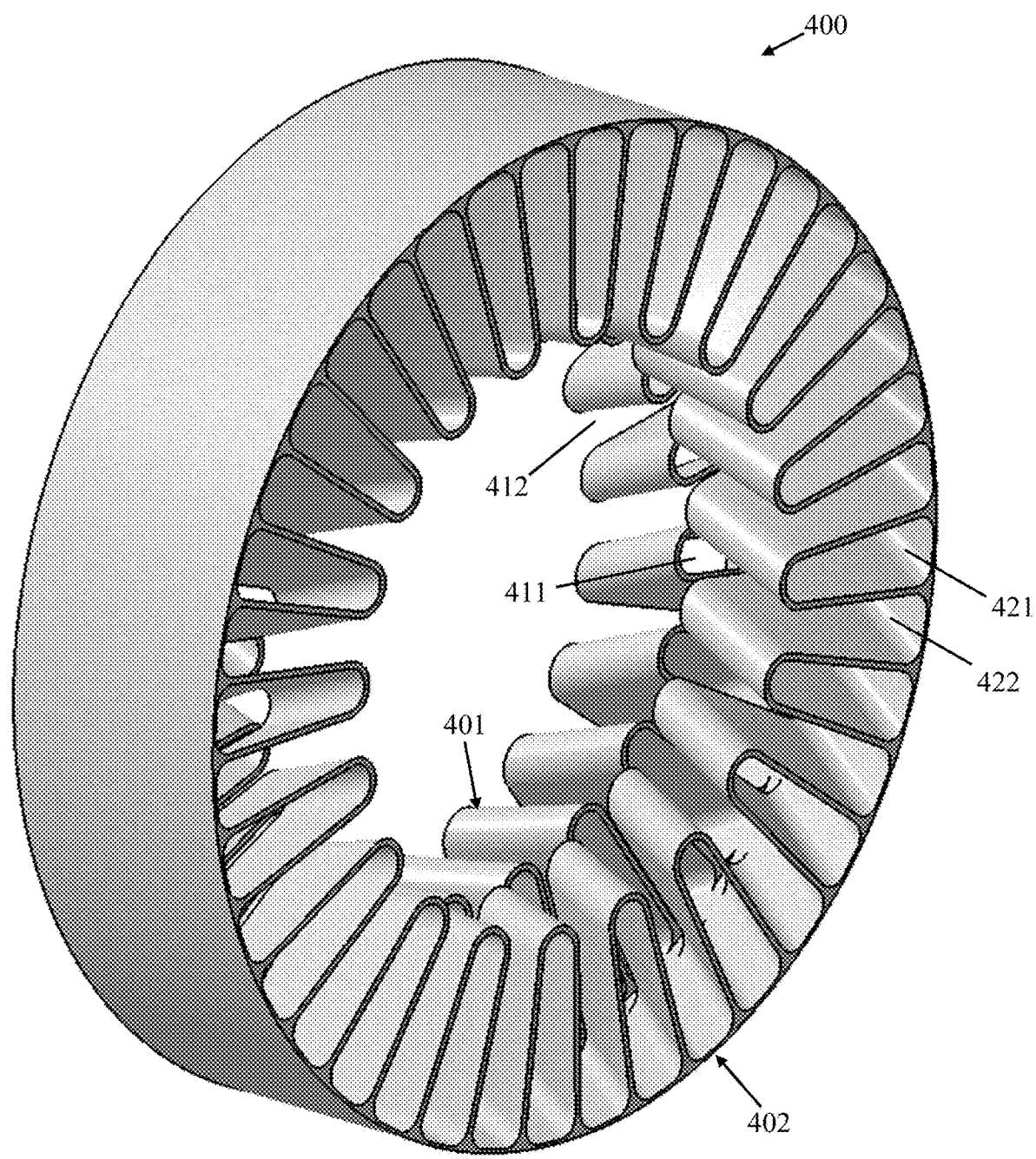
FIG. 4 is a schematic perspective view of another example assembly in accordance with the present invention.
Figure 5:
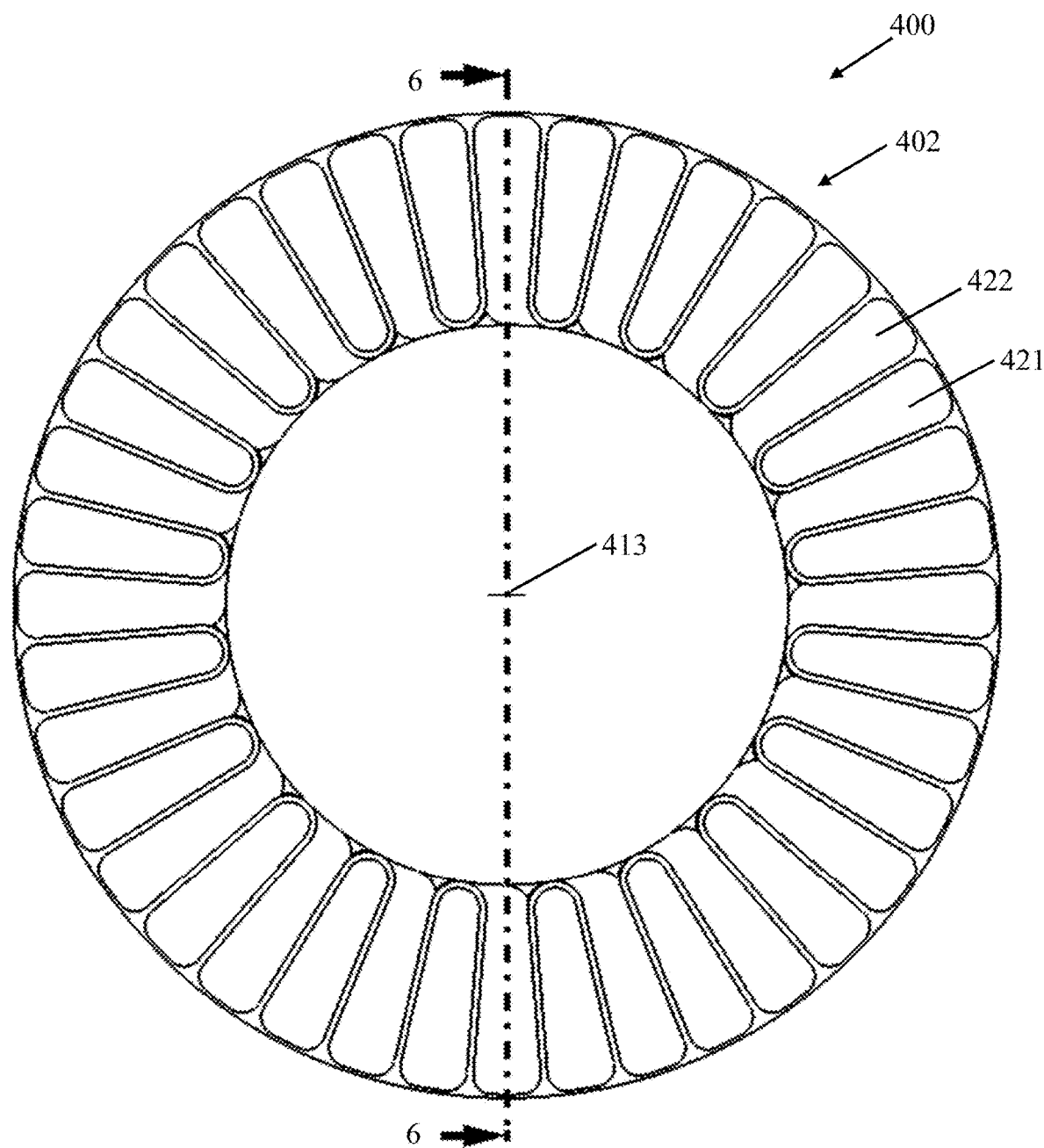
FIG. 5 is a schematic side view of the assembly of FIG. 4.
Figure 6:
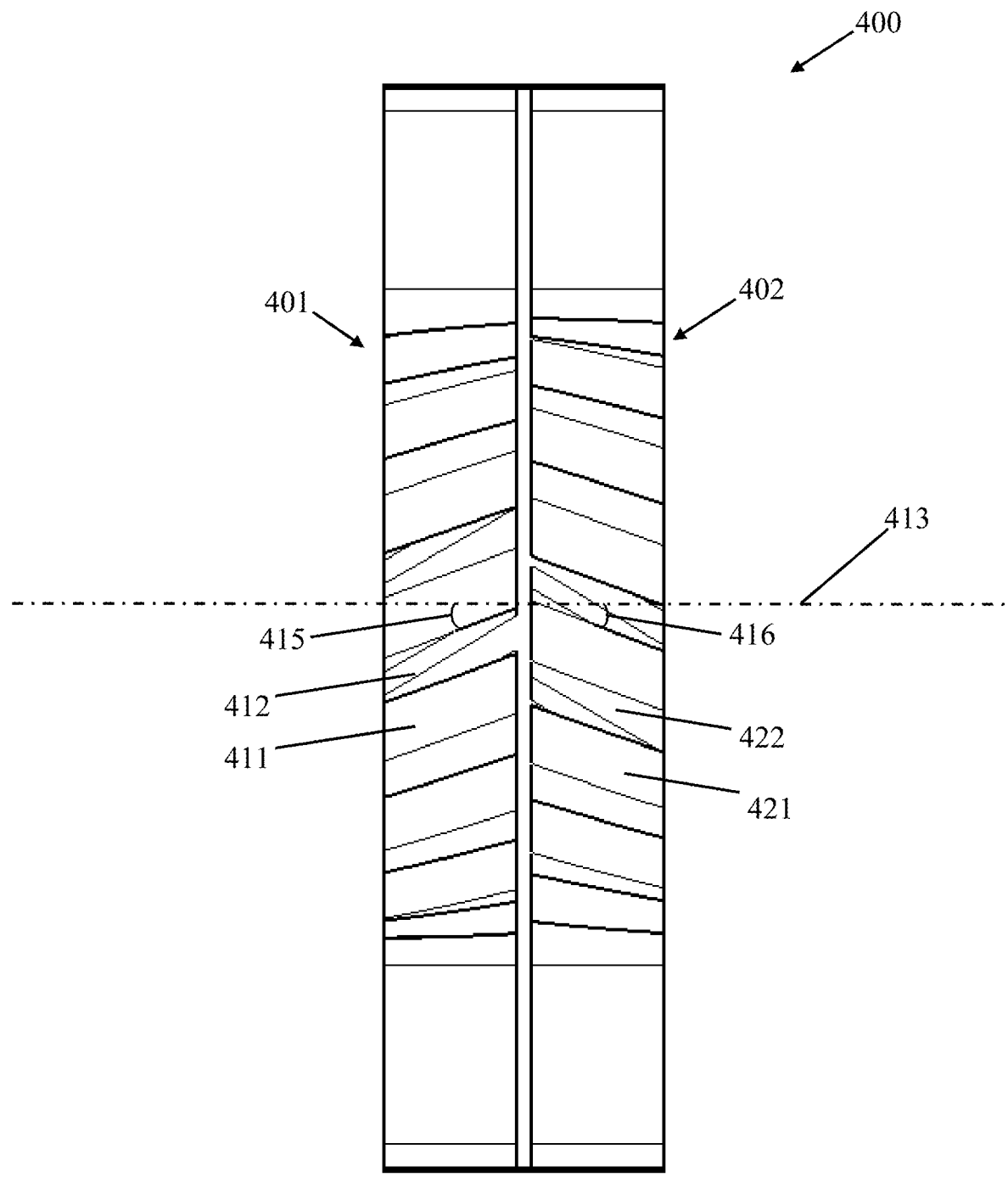
FIG. 6 is a schematic section view taken along line "6-6" in FIG. 5.

As shown in FIGS. 4-6, another example tire assembly 400 in accordance with the present invention may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly 400 may have an inner central rim (not shown), such as an automobile wheel as described above, and a circular outer flexible ring (not shown), which may include a shear band with a tread structure, mounted on the inner central rim by a continuous cord/fabric reinforced spoke structure 401 and/or 402 extending between the inner central rim and the outer flexible ring.

As shown in FIGS. 4-6, the tire assembly 400 in accordance with the present invention may include a first spoke structure 401 and a second spoke structure 402 each defining a plurality of alternating rectangular or trapezoidal closed cavities 411, 421 and rectangular or trapezoidal inlet openings 412, 422 rotating concentrically about a rotational axis 413 thereby allowing the spoke structures 401, 402 to deflect under load and define a suitable balance between flexibility for ride comfort and traction within a footprint of the assembly 400 and stiffness for vehicle handling, low rolling resistance, and low heat build-up within the spoke structures. The cavities 411 of the first spoke structure 401 and the cavities 421 of the second spoke structure 402 may further define openings for arms of the inner central rim to extend therethrough and secure the spoke structure to the inner central rim, as described above. The arms may engage portions of the spoke structures 401, 402 in a mechanical interlocking arrangement. The inner central rim may further include plates that, along with the arms, may sandwich portions of the spoke structures 401, 402 and create a further frictional and/or adhesive securement between the inner central rim and the spoke structure. The spoke structures 401, 402 may comprise homogenous or heterogeneous polymers and/or filled polymers.

The alternating cavities 411 and inlet openings 412 of the first spoke structure 401 may be formed such that each of the cavities and inlet openings of the first spoke structure form a first helical angle 415 relative to the rotational axis 413 of the assembly 400 (FIG. 3). The first helical angle 415 may be in the range from 0° to 45°. Thus, the cavities 411 and inlet openings 412 may extend axially, radially, and circumferentially relative to the rotational axis 413.

The alternating cavities 421 and inlet openings 422 of the second spoke structure 402 may be formed such that each of the cavities and inlet openings of the second spoke structure form a second helical angle 416 relative to the rotational axis 413 of the assembly 400 (FIG. 6). The second helical angle 416 may be in the range from 0° to −45°. Thus, the cavities 421 and inlet openings 422 may extend axially, radially, and circumferentially relative to the rotational axis 413. As shown in FIG. 6, the first helical angle 415 and the second helical angle 416 may be equal and opposite (e.g., 45° and −45°) and the spoke structures 201, 202 may be mirrored images of each other with a circumferential offset having the cavities 411 of the first spoke structure 401 being axially misaligned aligned with the cavities 421 of the second spoke structure 402.

Such a construction of the assembly 400 may improve uniformity and reduce noise generation during use. The helical spoke structures 401, 402 may gradually buckle and then gradually stretch or tension while entering and leaving a footprint while the assembly 400 rotates. This gradual buckling and tensioning may contribute to the reduction of noise generation. Since the spoke structures 401, 402 contact the shearband in both lateral and longitudinal directions, uniformity may be improved. Further, durability may be improved by a self cooling feature caused by the helical spoke structures 401, 402 moving, or pumping, air through the tire assembly 400 as the spoke structures buckle and tension during use.

The spoke structures 401, 402 may be curved inwardly or outwardly for mitigating or enhancing buckling of the spoke structures (not shown). The spoke structures 401, 402 may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be between 400 denier to 9000 denier. The polymeric film may be from 0.1 mm to 2.0 mm thick. The reinforcement in the spoke structures 401, 402 may be oriented at angle between 0 degrees and 90 degrees. The spoke structures 401, 402 may be continuously reinforced across its entire axial length. Continuous reinforcement layer(s) may extend radially outward to multiple locations adjacent to the shear band at the outer flexible ring. Other reinforcement layers may extend about the interior of the closed cavities 411, 421.

The continuous reinforcement layer(s) may be integrated into the spoke structures 401, 402 and the outer flexible ring. Alternatively, the shear band may be attached to the spoke structures 401, 402 by between 10 and 40 connection points each (e.g., adhesive, fused, welded, etc.).

Each cavity 411 and inlet opening 412 of the first spoke structure 401 may have a common cross sectional profile, respectively, about the rotational axis 213 of the assembly 200. Further, each cavity 411 and inlet opening 412 may have a common axial length, respectively, equal to a first uniform axial thickness of the first spoke structure 401. Each cavity 411 may be curvedly shaped to prevent "pinch" points on the reinforcement layer(s) and mitigate compressive stress concentrations on the reinforcement layer(s). The number of cavities 411 may be between 2 and 60 for large scale assemblies 400.

Each cavity 421 and inlet opening 422 of the second spoke structure 402 may have a common cross sectional profile, respectively, about the rotational axis 413 of the assembly 400. Further, each cavity 421 and inlet opening 422 may have a common axial length, respectively, equal to a second uniform axial thickness of the second spoke structure 402. The second uniform axial thickness of the second spoke structure 402 may be equal to the first uniform axial thickness of the first spoke structure 401. Each cavity 421 may be curvedly shaped to prevent "pinch" points on the reinforcement layer(s) and mitigate compressive stress concentrations on the reinforcement layer(s). The number of cavities 411 may be between 2 and 60 for large scale assemblies 400.

Variations in the present invention are possible in light of the description of examples provided herein. While certain representative examples and details have been shown for the purpose of illustrating the subject invention, it will be apparent to those skilled in this art that various changes and modifications can be made therein without departing from the scope of the subject invention. It is, therefore, to be understood that changes may be made in the particular examples described which will be within the full scope of the present invention as defined by the following appended claims. Further, the present invention is not limited to the examples hereinbefore described which may be varied in both construction and detail within the full scope of the appended claims.

What is claimed:

1. A tire assembly for transferring rotation about an axis from an outer flexible ring to an inner central rim, the tire assembly comprising:
    a first spoke structure extending radially between the central rim and the flexible ring, the first spoke structure defining a plurality of radially extending closed first cavities and an alternating plurality of radially extending inlet first openings disposed concentrically about the axis and allowing the flexible ring to deflect under load, each of the closed first cavities extending axially and circumferentially at a first helical angle relative to the axis, the first spoke structure having a first continuous reinforcement layer extending radially outward to multiple locations adjacent to the outer flexible ring;
    a second spoke structure extending axially adjacent the first spoke structure and extending radially between the central rim and the flexible ring, the second spoke structure defining a plurality of radially extending closed second cavities and an alternating plurality of radially extending inlet second openings disposed concentrically about the axis and allowing the flexible ring to deflect under load, each of the closed second cavities extending axially and circumferentially at a second helical angle relative to the axis, the first helical angle being equal in magnitude to the second helical angle, the second spoke structure having a second continuous reinforcement layer extending radially outward to multiple locations adjacent to the outer flexible ring; and the first and second spoke structures being attached to the outer flexible ring by between 10 and 40 connection points, each of the plurality of radially extending closed cavities being curvedly shaped to prevent pinch points on the spoke structures.

2. The tire assembly as set forth in claim 1 wherein the first spoke structure is a mirrored opposite image of the second spoke structure.

3. The tire assembly as set forth in claim 1 wherein the first helical angle is in the range between 0° and 45°.

4. The tire assembly as set forth in claim 1 wherein the second helical angle is in the range between 0° and −45°.

5. The tire assembly as set forth in claim 1 wherein each first cavity of the first spoke structure has a common radial dimension.

6. The tire assembly as set forth in claim 1 wherein each second cavity of the second spoke structure has a common radial dimension.

7. The tire assembly as set forth in claim 1 wherein each first cavity of the first spoke structure has a common length equal to a uniform axial thickness of the first spoke structure divided by the cosine of the first helical angle.

8. The tire assembly as set forth in claim 1 wherein each second cavity of the second spoke structure has a common length equal to a uniform axial thickness of the second spoke structure divided by the cosine of the second helical angle.

9. The tire assembly as set forth in claim 1 wherein the first spoke structure is a mirrored opposite image of the second spoke structure such that structures of the first spoke structure approach equivalent structures on the second spoke structure at a centerline of the tire assembly.

10. The tire assembly as set forth in claim 1 wherein the first spoke structure is a mirrored opposite image of the second spoke structure such that structures of the first spoke structure are circumferentially offset from equivalent structures on the second spoke structure at a centerline of the tire assembly.

11. A method for non-pneumatically supporting a mobile vehicle comprising the steps of:
    extending a first spoke structure axially and radially between an inner central rim and an outer flexible ring to define alternating cavities and openings;
    extending a first continuous reinforcement layer through the first spoke structure radially outward to multiple locations adjacent the outer flexible ring;
    rotating the first spoke structure about an axis;
    extending a second spoke structure axially adjacent the first spoke structure and axially and radially between an inner central rim and an outer flexible ring to define alternating cavities and openings;
    extending a second continuous reinforcement layer through the second spoke structure radially outward to multiple locations adjacent the outer flexible ring;
    rotating the second spoke structure about an axis;
    extending each cavity of the first spoke structure and each opening of the first spoke structure axially and circumferentially at a common first helical angle relative to the axis;
    extending each cavity of the second spoke structure and each opening of the second spoke structure axially and circumferentially at a common second helical angle relative to the axis;
    attaching the first and second spoke structures to the outer flexible ring by between 10 and 40 connection points;
    curvedly shaping each of the plurality of radially extending closed cavities to prevent pinch points on the spoke structures; and
    vertically loading the flexible ring such that the flexible ring and a parts of the both the first and second spoke structures adjacent to the flexible ring all deflect vertically.

12. The method as set forth in claim 11 wherein the first helical angle is in the range between 0° and 45°.

13. The method as set forth in claim 11 the second helical angle is in the range between 0° and −45°.

14. The method as set forth in claim 11 wherein the first spoke structure is a mirrored opposite image of the second spoke structure such that structures of the first spoke structure approach equivalent structures on the second spoke structure at a centerline of the tire assembly.

15. The method as set forth in claim 11 wherein the first spoke structure is a mirrored opposite image of the second spoke structure such that structures of the first spoke structure are circumferentially offset from equivalent structures on the second spoke structure at a centerline of the tire assembly.

\* \* \* \* \*